US005482348A

United States Patent [19]

Mass et al.

[11] Patent Number: 5,482,348

[45] Date of Patent: Jan. 9, 1996

[54] VEHICLE HOOD SUPPORT POST MEMBER

[75] Inventors: Noah B. Mass, Ann Arbor; Mark C. White, Livonia; Martin G. Hagen, Berkley, all of Mich.

[73] Assignee: Ford Motor Company, Dearborn, Mich.

[21] Appl. No.: 89,363

[22] Filed: Jul. 12, 1993

[51] Int. Cl.[6] .......... B60R 27/00

[52] U.S. Cl. .......... 296/207; 180/69.21; 411/258; 411/535; 411/930; 16/82; 248/205.3; 403/345

[58] Field of Search .......... 296/207; 180/69.2, 180/69.21; 411/82, 258, 508, 509, 535, 536, 546, 930, 969; 16/82; 403/345; 248/157, 178, 205.3

[56] References Cited

U.S. PATENT DOCUMENTS

| | | | |
|---|---|---|---|
| 3,604,306 | 9/1971 | Denholm . | |
| 3,682,508 | 8/1972 | Briles . | |
| 3,880,535 | 4/1975 | Durham et al. | 248/205.3 X |
| 3,897,713 | 8/1975 | Gugle | 411/930 X |
| 4,186,476 | 2/1980 | Maier et al. | 180/69.2 X |
| 4,352,589 | 10/1982 | Allison et al. . | |
| 4,389,035 | 6/1983 | Freeman | 248/205.3 X |
| 4,425,065 | 1/1984 | Sweeney | 411/23 |
| 4,433,930 | 2/1984 | Cosenza | 403/12 |
| 4,448,565 | 5/1984 | Peterson | 403/408 |
| 4,493,577 | 1/1985 | Cosenza | 403/41 |
| 4,514,125 | 4/1985 | Stol | 411/82 |
| 4,653,968 | 3/1987 | Radata et al. | 180/69.2 X |
| 4,690,365 | 9/1987 | Miller et al. | 248/650 |
| 4,784,550 | 11/1988 | Wollar | 411/508 X |
| 4,826,380 | 5/1989 | Henry | 411/377 |
| 4,828,209 | 5/1989 | Niemi | 411/508 X |
| 4,867,599 | 9/1989 | Sasajima | 403/405.1 |
| 4,868,968 | 9/1989 | Dixon et al. | 29/460 |
| 4,906,152 | 3/1990 | Kurihara | 411/508 X |
| 4,924,549 | 5/1990 | More et al. | 16/82 |
| 4,993,900 | 2/1991 | Hugel et al. | 411/82 |
| 5,044,852 | 9/1991 | Sweeney et al. | 248/205.3 X |
| 5,193,961 | 3/1993 | Hoyle et al. | 411/508 X |
| 5,314,280 | 5/1994 | Gagliardi et al. | 411/535 X |
| 5,375,953 | 12/1994 | Krug et al. | 411/82 X |

FOREIGN PATENT DOCUMENTS

| | | | |
|---|---|---|---|
| 1018215 | 11/1991 | WIPO | 411/82 |

*Primary Examiner*—Dennis H. Pedder
*Attorney, Agent, or Firm*—Daniel M. Stock; Roger L. May

[57] ABSTRACT

A two-piece hood support bumper of such construction that it can be set at an infinitely determinable height by the weight and/or position of the hood itself during the process of installing the support member, and whereby the support member is permanently set in that position by an adhesive carried within the two-piece member prior to the final position being set. A method of installing a vehicle hood assembly by providing a self-height adjusting support member intermediate the ends of the hoods and at both side edges, and which is set in its final position after bringing both ends of the hood into a condition flush with the adjoining body panels and wherein the height of the support member is established by the hood itself as it is brought to rest on the front hood bumpers.

4 Claims, 2 Drawing Sheets

VEHICLE HOOD SUPPORT POST MEMBER

TECHNICAL FIELD

This invention relates to a support post member for supporting flexible panels at a fixed height relative to an adjoining panel member in flush condition relative to the adjoining panel member, and is particularly related to the installation of automotive hood assemblies and supporting these hood assemblies flush with the adjoining fender line.

BACKGROUND ART

Heretofore, the standard practice for automotive hood assemblies has been to construct the hood of sheet metal, stamped to whatever contours are required of the automotive design, and to reinforce the hood in various ways to assure its maintaining its contour and, essentially, its non-flexibility. The means of reinforcing include reinforcement beams on the underside of the hood extending from opposite corners, as well as turning down the side edges of the hood to provide a reinforcing flange extending from one end of the hood to the other. The hood is made flush with the vehicle by setting the height of the hood hinges at one end and the height of conventional hood bumpers at the other end such that both ends are flush with the adjoining vehicle panels. Since the hood is fairly rigid, its predetermined stamped contour, reinforced as described, will reasonably assure that the hood will be maintained flush with the fender line of the vehicle and will not be damaged or permanently set in some out of flush condition by some externally applied load, e.g., automatic car washing rolls, or someone just sitting on it. More recently, the automotive industry has turned to using plastic fabricated external body panels and other parts wherever possible because of decreased weight, increased durability, and a host of other reasons. This has included a turn to using plastic engine compartment hoods, and these hoods are more flexible than the prior metal hoods for a variety of engineering design reasons, including the desirability of eliminating the more conventional hood reinforcement techniques.

SUMMARY OF THE INVENTION

The present invention contemplates a two-piece hood support bumper of such construction that it can be set at an infinitely determinable height by the weight and/or position of the hood itself during the process of installing the support member, and whereby the support member is permanently set in that position by an adhesive carried within the two-piece member prior to the final position being set.

The invention further contemplates a method of installing a vehicle hood assembly by providing a self-height adjusting support member intermediate the ends of the hoods and at both side edges, and which is set in its final position after bringing both ends of the hood into a condition flush with the adjoining body panels and wherein the height of the support member is established by the hood itself as it is brought to rest on the front hood bumpers.

In carrying out the above objects and other objects of the present invention, a vehicle body panel support system is disclosed for supporting a body panel part member such as an automobile hood, at a position flush with a second body part within a predetermined height range. It comprises a height establishing member having a longitudinal axis and a support member for retaining and supporting the height establishing member at a fixed final height relative to the support member at any initial infinitely variable point within a predetermined range along the longitudinal axis. One member is initially telescopically received by the other member and means for fixing the final height between the members comprises an adhesive applied between the members along the longitudinal axis.

Further in carrying out the invention, a method is provided for installing a vehicle hood assembly to a vehicle. The hood assembly includes a generally panel-like hood supported at one end thereof by a hinge means to the vehicle and flush with the adjoining vehicle body panel. A vehicle support bracket underlies a remaining portion of the hood opposite one end. The method comprises:

(a) installing a pin retaining support member onto the support bracket, the pin retaining support member includes a longitudinal axis, and a bore centered along the longitudinal axis and extending through a substantial portion of the support member;

(b) inserting a hood height establishing pin partially within the bore, the pin having an elongate shank;

(c) providing at least one of the pin and the support members with an adhesive means whereby as one engages the other the adhesive means will be distributed so as to set over time and fix the position of the pin relative to the support member;

(d) providing a rest means for supporting the remaining portion of the hood in a position flush with all remaining adjacent vehicle body panels; and (e) thereafter closing the hood to bring it to rest on the rest means at a position flush with the fender line and thereby causing the hood to engage the hood height establishing pin and force the pin into the support member and causing such pin to come to rest and thereafter be set by the adhesive means in a fixed position relative to the support member.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
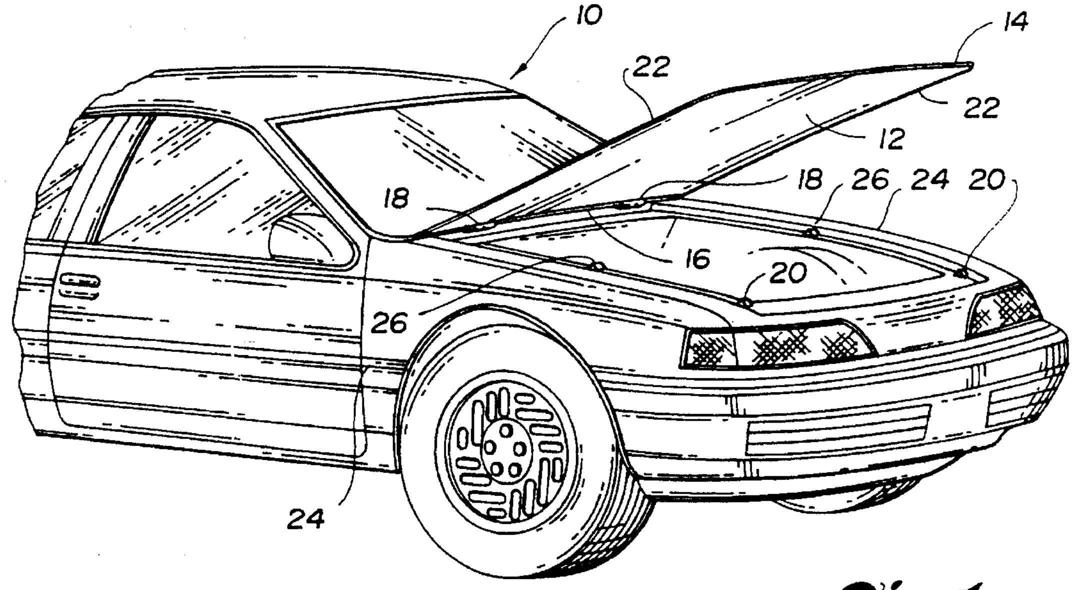
FIG. 1 is a representative partial perspective view showing the front end of a vehicle having a hood assembly in open position.

Referring now to the drawings, and in particular to FIG. 1, a vehicle 10 is shown having a front hood 12 for covering the engine compartment. The hood 12 is generally rectangular, including front and rear ends 14,16 with the rear end being supported on hinges 18 and the front end being supported on conventional screw-type hood bumpers 20 located at each of the front corners of the hood. The hood 12 is of general uniform thickness and may or may not include reinforcement flanges along the side edges 22 and/or reinforcing rib members or cross-members on the undersurface thereof. The hood is contoured from the front edge to the rear edge to generally match the fender line of the quarter panel 24. In accordance with the invention, there is positioned approximately mid-way of the hood along the fender line a pair of hood support members 26, each being secured to a frame support bracket 28, usually metal, commonly referred to as a "shotgun".

When installing the hood on the vehicle, the hinges are set at a position where the hood at its rear end 16 is flush with the adjoining quarter panel members and the body panel member, if any, extending across the width of the windshield. Similarly, the hood is set flush with the fender line at its front end by manually adjusting the height of the screw-type hood bumpers 20. As described below, the height of the hood support member 26 is to be automatically set by the support member itself as the hood is brought down upon the hood bumpers.

Figure 2:
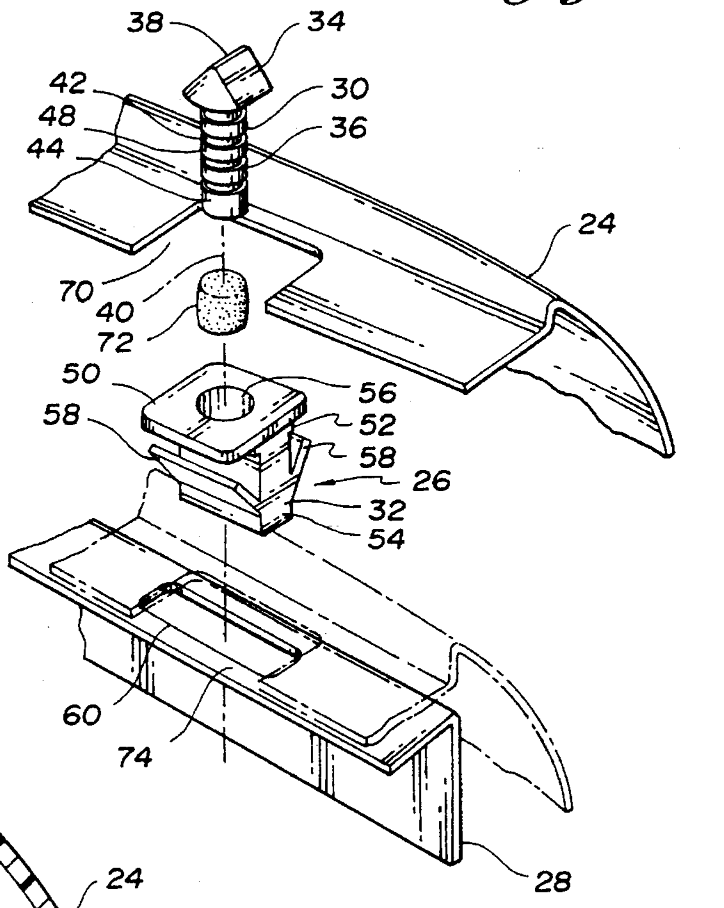
FIG. 2 is a perspective exploded view of an automotive body panel, and associated subframe support bracket, having installed therein the hood support member of the present invention.
Figure 3:
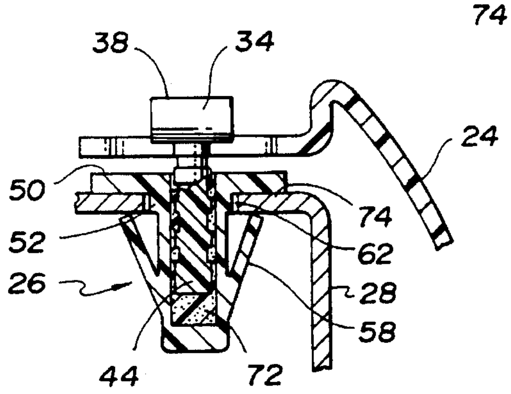
FIG. 3 is a cross-sectional view of the present invention illustrating the construction of FIG. 2 in its assembled state.

As seen in FIGS. 2 and 3, one preferred embodiment of a hood support member in accordance with the present invention is generally designated 26. It includes a height establishing pin 30 and a pin receiving support member 32. The pin includes a head 34 and a shank 36. The pin 30 can be of composite construction, such a having a steel shank with a rubber head, or it can be a one-piece construction, i.e. all plastic. The pin head 34 includes a pair of side walls converging at a crest 38 to provide a minimum contact point with the hood, thereby maintaining to a minimum any load on the hood as it engages the support panel, particularly when some external load might be applied. The shank 36 is cylindrical along an axis 40 and includes a series of generally equally spaced annular retention grooves 42 cut or otherwise formed into the pin and terminating in a butt end 44 of a length substantially greater than the grooves 42, and the ribs 48 between the grooves, to thereby provide a reliable guide surface as the butt end of the pin is inserted within pin support member 32. Grooves 42 provide an additional bonding area for the adhesive.

Pin support member 32 includes a head portion 50, a neck 52, and an elongated body portion 54 extending along the vertical axis of the support member on the side of the head portion opposite the pin 30. A bore 56 extends vertically through the head portion 50, neck portion 52, and elongate body portion 54 to nearly its full depth. The bore 56 is centered relative to the length and width of the insert. Body portion 54 includes a pair of resilient retaining leg members 58 integrally molded as part of the body portion and each diverging from a respective side of the body portion at an acute angle and in the direction of the head portion and to a distance and length just short of the neck portion 54. Also, the neck portion 52 transverse width is slightly less than the width of elongate slot 60 located in the shotgun 28 as seen in FIG. 3, thereby providing a slight clearance designated 62.

Installation of the support member 26 on shotgun 28 is illustrated in FIGS. 2 and 3. Support member 26 is positioned above slot 60 of support bracket 28 prior to assembly. Upon insertion, retaining members 58 are initially compressed and upon full insertion, extend out below the lower surface of support bracket 28. As shown in FIG. 3, retaining members 58 securely position support member 26 within the slot 60. Neck portion 52 is positioned within elongate slot 60 forming a near contact fit, thereby precluding any possibility of the support member becoming off-center with the slot.

A sight hole 70 is cut from or otherwise formed in fender panel 24 to frame the elongate slot 60 in the support bracket 28 and thereby allow installation of the support member 26.

Either before or after installation of the support member 26 to the support bracket 28, a "gum drop" 72 of adhesive, as shown in FIG. 2, is placed over the bore 56 of the support member. Thereafter, the pin 30 is inserted into bore 56 a sufficient distance to partially spread the adhesive 72 and temporarily secure the pin 30 within the bore.

At this point of the installation of the hood assembly, the front and rear ends of the hood panel have already been set at a position flush with the adjoining body panels. Thus, when the hood is brought down to rest on the front bumpers 20, the underside of the hood panel will engage the pin head 34 forcing the pin down into the bore 56 of the support member. The head portion 50 of the support member being wider than the slot 60 precluding any downward movement of the support member itself. Thus, the pin will be caused to slide within the bore 56 forcing adhesive 72 within the retention grooves 42 and coming to rest at the point of flushness established by the hood panel front and rear supports, namely, hinges 18 and hood bumpers 20. Thereafter, prior to putting any sort of load on the flexible hood panel, the adhesive is allowed to set thus fixing the position of the pin relative to the support member 26 and thereby assuring that the hood panel will be maintained flush with the adjoining fender line even at points intermediate the front and rear ends of the panel and irrespective of any degree of flexibility of the hood panel itself.

Figure 4:
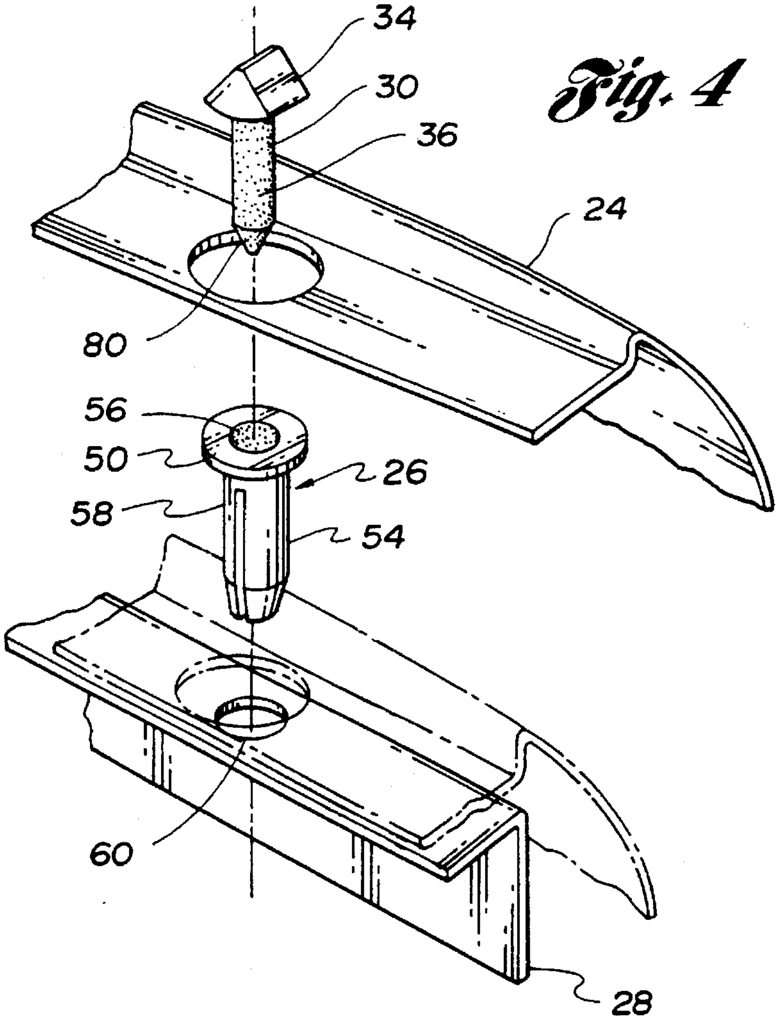
FIG. 4 is a perspective exploded view similar to FIG. 2 of an alternative embodiment of the present invention.
Figure 5:
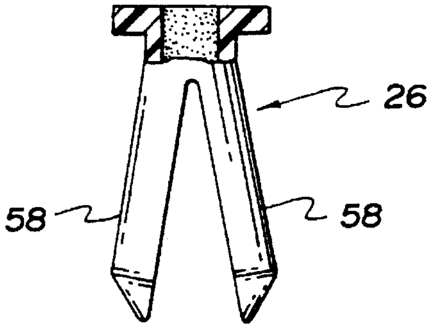
FIG. 5 is a partially cross-sectional view of the hood support member shown in FIG. 4.

FIGS. 4 and 5 show another embodiment of the present invention which includes a support member 26 and a pin 30. The pin 30 includes a head portion 34 identical to that previously described. However, the shank portion 36 is cylindrical and smooth. It includes no retention grooves as previously described, and its butt end is generally pointed is shown at 80. The pin support member 26 is sometimes conventionally referred to as a "scrivet." It includes a head portion 50, an elongate body portion 54, and a bore 56 extending concentrically through the head portion and body portion. The body portion 54 includes two generally diverging leg portions 58 joined near the head portion 50 and diverging towards its ends to provide a spread greater than the diameter of the retaining hole 60 formed in the support bracket 28. The diameter of the retaining hole 60 is only slightly greater than that of the scrivet at its head portion, such that the scrivet is installed by simply pushing it through the hole and allowing the retaining legs to spread and grip the underside of the hole. The diameter of the head portion 50 is sufficiently greater than that of the retaining hole 60 and the bracket to provide a support similar to that provided by shoulders 74 of the support brackets shown in FIGS. 2 and 3. Unlike the first described embodiment of FIGS. 2 and 3, the support member and associated support pin do not require a separate gum drop of adhesive. Instead, there is provided a two part self-setting epoxy-type adhesive whereby the part A of the epoxy is spread on the pin and part B of the epoxy is spread over the bore of the support member 26. When installing the hood, the pin is installed within the support member or is partially installed within the support member just prior to closing the hood on the front hood support bumpers and prior to allowing the epoxy to set. Thereafter, as the hood is brought down on the pin head, the pin will be set to the desired height in the same manner as previously described and the adhesive will set the pin in its fixed position as previously described.

Other alternative embodiments will be apparent to ones skilled in the art, including using the two-part epoxy and cylindrical pin with the support member 26 as described in connection with FIGS. 2 and 3.

Also, it will be apparent to one skilled in the art that the hood assembly installation can include the use of the hood support member described in FIGS. 2–5 as the hood front end bumpers. With such a system, the hood would be secured on hinges and in a position flush with the adjoining body panels. Thereafter the front end hood support members would be installed in the subframe bracket member extending across the grillwork of the car. Thus, the hood would be closed onto a gauge block also resting on the subframe support bracket and holding the front end of the hood flush with the adjoining quarter panel fender line. The gauge block and hood would be left in this position until the adhesive becomes set in the support member and thereafter the gauge block may be removed concurrently with setting the front end of the hood flush with the fender line. The same hood support members as described in connection with FIGS. 2–5 could be installed intermediate the ends of the hood as previously described so that all hood support members are set in one operation.

While the best mode for carrying out the invention has been described in detail, those familiar with the art to which this invention relates will recognize various alternative designs and embodiments for practicing the invention as defined by the following claims.

We claim:

1. In combination, a vehicle body panel support assembly supporting a vehicular body panel part member such as an automobile hood, at a position flush with a second body part and within a predetermined height range, said body panel support assembly consisting of:

an unthreaded height establishing member having a longitudinal axis;

said height establishing member comprising a pin having an elongate shank extending along said longitudinal axis, a panel supporting head at one end of said pin and a pilot portion at the opposite end of said pin;

a support member for retaining and supporting said height establishing member at a fixed final height relative to said support member at any initial infinitely variable point within a predetermined range along said longitudinal axis;

said pilot portion being initially slidably received within said support member to a point along said longitudinal axis at said fixed final height; and means for fixing the final height between said members consisting of an adhesive applied between said members along said longitudinal axis, said adhesive being applied to said pilot portion to thereby secure the pin in fixed position relative to said support member and with said head of the height establishing member projecting beyond said support member at the fixed final height to thereby support said body panel part at a position flush with a second body part.

2. A vehicle body panel support system as in claim 1 wherein said support member includes a pin supporting head portion and a body portion, said pin supporting head portion joining said body portion and extending transversely of said body portion to thereby provide a support shoulder adapted to rest upon an adjoining vehicle body part and thereby take the load of a body panel supported on said pin.

3. A vehicle body panel support system as in claim 2 wherein said support member includes a bore centered along said longitudinal axis and extending through said pin supporting head portion and into said body portion.

4. A vehicle body panel support system as in claim 3 wherein said body portion includes a pair of retaining flanges diverging from said body portion at an acute angle toward said head portion.

* * * * *